United States Patent

Mizutome et al.

[11] Patent Number: 6,072,555
[45] Date of Patent: Jun. 6, 2000

[54] DISPLAY APPARATUS CAPABLE OF GRADATIONAL DISPLAY

[75] Inventors: Atsushi Mizutome, Hayamamachi; Kazunori Katakura; Jun Iba, both of Atsugi, all of Japan

[73] Assignee: Canon Kabushiki Kaisha, Tokyo, Japan

[21] Appl. No.: 08/789,869

[22] Filed: Jan. 28, 1997

[30] Foreign Application Priority Data

Feb. 1, 1996 [JP] Japan .................................. 8-016601

[51] Int. Cl.[7] .......................... G02F 1/1335; G02F 1/1343
[52] U.S. Cl. .......................... 349/144; 349/108; 349/148
[58] Field of Search ................. 349/37, 85, 108, 349/109, 143, 144, 148

[56] References Cited

U.S. PATENT DOCUMENTS

| | | | |
|---|---|---|---|
| 4,709,995 | 12/1987 | Kuribayashi et al. | 345/89 |
| 4,712,877 | 12/1987 | Okada et al. | 349/85 |
| 4,728,176 | 3/1988 | Tsuboyama et al. | 349/138 |
| 4,776,676 | 10/1988 | Inoue et al. | 349/85 |
| 4,791,417 | 12/1988 | Bobak | 349/89 |
| 4,796,980 | 1/1989 | Kaneko et al. | 349/85 |
| 4,818,078 | 4/1989 | Mouri et al. | 349/37 |
| 4,824,218 | 4/1989 | Kuno et al. | 349/37 |
| 4,902,103 | 2/1990 | Miyake et al. | 349/144 |
| 5,000,545 | 3/1991 | Yoshioka et al. | 349/148 |
| 5,124,695 | 6/1992 | Green | 345/103 |
| 5,212,575 | 5/1993 | Kojima et al. | 349/147 |
| 5,317,437 | 5/1994 | Katakura | 349/144 |
| 5,404,236 | 4/1995 | Hartman et al. | 349/143 |
| 5,438,442 | 8/1995 | Katakura | 349/144 |
| 5,552,911 | 9/1996 | Okada et al. | 349/106 |

FOREIGN PATENT DOCUMENTS

| | | |
|---|---|---|
| 0261898 | 3/1988 | European Pat. Off. . |
| 316 774 | 5/1989 | European Pat. Off. . |
| 0361981 | 4/1990 | European Pat. Off. . |
| 0453033 | 10/1991 | European Pat. Off. . |
| 0526135 | 2/1993 | European Pat. Off. . |
| 600 537 | 6/1994 | European Pat. Off. . |
| 0671648 | 9/1995 | European Pat. Off. . |
| 0671649 | 9/1995 | European Pat. Off. . |
| 0673012 | 9/1995 | European Pat. Off. . |

*Primary Examiner*—William L. Sikes
*Assistant Examiner*—Dung Nguyen
*Attorney, Agent, or Firm*—Fitzpatrick, Cella, Harper & Scinto

[57] ABSTRACT

A display apparatus is constituted to have a multiplicity of pixels each divided into at least two sub-pixels having mutually different areas including a larger sub-pixel having a larger area and a smaller sub-pixel having a smaller area. Each sub-pixel is provided with a transparent electrode and a low-resistivity conductor connected to the transparent electrode, and the low-resistivity conductor for the larger sub-pixel is set to have a lower resistance than the low-resistivity conductor for the smaller sub-pixel. As a result, a pixel switching characteristic can be uniformized over an entire picture area of the display apparatus regardless of different areas (loads) of the sub-pixels and without using different performances of drivers.

45 Claims, 9 Drawing Sheets

LEVEL 0　　　LEVEL 1　　　LEVEL 2　　　LEVEL 3

LEVEL 4　　　LEVEL 5　　　LEVEL 6　　　LEVEL 7

LEVEL 8　　　LEVEL 9　　　LEVEL 10　　　LEVEL 11

LEVEL 12　　　LEVEL 13　　　LEVEL 14　　　LEVEL 15

DISPLAY APPARATUS CAPABLE OF GRADATIONAL DISPLAY

FIELD OF THE INVENTION AND RELATED ART

The present invention relates to a display apparatus equipped with an electrode matrix comprising scanning signal lines and data signal lines to be driven by receiving scanning signals and data signals, respectively, particularly a display apparatus capable of gradational display by using pixels each divided into a plurality of sub-pixels having different areas.

Hitherto, various proposals have been made regarding a method of realizing a multi-level gradation on a liquid crystal display device (LCD) inclusive of the following.

(1) In a first type of method, an applied voltage to respective pixels is controlled according to an applied voltage-transmittance curve to obtain a desired level of luminance at the respective pixels. This is typically adopted in an active matrix-type LCD using a TN (twisted nematic) liquid crystal. Further, in the case of using a ferroelectric chiral smectic liquid crystal, a method of changing an areal ratio between domains in two orientation states has been proposed, e.g., as disclosed in U.S. Pat. Nos. 4,712,877, 4,796,980, 4,824,218, and 4,776,676. In the above-described method (1), however, if the applied voltage-transmittance curve is very steep, a large change in luminance occurs in response to a slight fluctuation in applied voltage, so that it is difficult to accurately display a desired level of luminance.

(2) In a second type of method, one frame scanning is divided into plural sub-frames of scanning so as to modulate an ON/OFF time ratio to effect a multi-level gradational display, e.g., as disclosed in U.S. Pat. No. 4,709,995. In the method (2), however, some difficulties can be encountered, such that the control circuit becomes complicated and a high-speed scanning is required in order to suppress the occurrence of flicker, thereby posing a large load on the display device and the peripheral circuit therefor.

Other methods include (3) a method using display units (or pixels) each including plural pixels (or sub-pixels) having different areas and turning on the plural pixels (or sub-pixels) in various patterns to display multiple gradation levels, as disclosed in European non-examined application publications EP-A 261898, EP-A 361,981 and EP-A 453,033.

Specific examples of the method (3) and characteristics thereof will be descried with reference to FIGS. 1A–1C and FIG. 2, each intended to display 16 levels of gradational display. Further, in each type, pixel division areal ratios can be varied depending on the intended use or application of the product display device.

Each of the above-mentioned examples of the display device for the method (3) is characterized by a whole picture area in which at least two types of pixels are present in mixture. From another aspect, it is also possible to regard that each pixel (or display element) is composed of at least two sub-pixels (or pixels). These are two expressions having substantially the same meaning. The description hereinafter will be made generally based on the latter expression.

In each of the specific examples shown in FIGS. 1A and 1B, four-sub-pixels are used as a unit to constitute a pixel capable of displaying multi-gradation levels. In order to obtain 16 linear optical levels of 0–15, these sub-pixels are set to have areal ratios of 8:4:2:1, and electrodes corresponding to the respective sub-pixels are selectively and sequentially driven depending on given image data.

The examples of FIGS. 1A and 1B are different from each other only in arrangement of the four sub-pixels. More specifically, the sub-pixels shown in the example of FIG. 1A, for example, are formed at intersections of four data electrodes and one scanning electrode while setting the widths of the data electrodes in ratios of 8:4:2:1 in order to provide the above-mentioned areal ratios among the sub-pixels. These two types of electrodes may be disposed on a pair of oppositely disposed substrate in a known manner.

Linear optical levels may generally be obtained by setting the areal ratios of sub-pixels to satisfy $2^n:2^{n-1}: \ldots : 2^1:2^0$ as described above. In this method, an image processing method such as the dither method or the average concentration method may generally be further used in combination in order to obtain a more natural image.

In the specific example shown in FIG. 1C, 9 sub-pixels having areal ratios as shown are used as a unit (a pixel), and electrodes corresponding to the sub-pixels having different areas are driven selectively and sequentially depending on given image data. As a result, as shown in FIG. 2. White display sub-pixels are disposed symmetrically vertically and horizontally. Accordingly, in the case of this sub-pixel arrangement pattern, a center of ON region (white display portion) is always at the center of the pixel (including 9 sub-pixels) at any gradation level. As a result, it is possible to obviate an image quality deterioration of so-called "false contour" caused when an optical gravitation center is shifted remarkably depending on a gradation pattern.

Each (sub-)pixel of such a liquid crystal panel may be formed by a pair of electrodes, at least one of which may preferably be formed of a transparent electroconductive oxide, examples of which may include: tin oxide, indium oxide and indium tin oxide (ITO). In order to comply with requirements for a larger display area and a higher resolution in recent years, it has been also practiced to dispose a low-resistivity conductor (line) of a metal, such as Al or Cu which has a lower resistivity than a transparent conductor, so as to obviate a delay in transmission of drive waveform liable to accompany such requirements.

In the case of a display device comprising pixels each divided into a plurality of sub-pixels having different areas, if a metal conductor as described above is disposed in an identical width and an identical thickness over the respective sub-pixels, the load of a sub-pixel (conductor resistance X electrode capacitance) on a drive circuit varies for the respective sub-pixels, thus resulting in a difference in drive waveform delay characteristic (e.g., a time for rising or falling down of a waveform). This leads to a fluctuation in liquid crystal switching characteristic for the respective sub-pixels, thus causing an image quality deterioration, such as a fluctuation in luminance or gradational characteristic over a picture area or screen.

In order to solve the above-mentioned problem, it may be conceived of to adjust the capacity or performance of a drive circuit (driver IC) depending on the size (or load) of a (sub-)pixel on a panel to which the drive circuit is connected. This however results in an increased load in designing of a drive circuit and makes it impossible to use a general-purpose driver IC. In other words, the designed driver IC cannot be used for a panel having a different pixel arrangement.

SUMMARY OF THE INVENTION

An object of the present invention is to provide a display apparatus capable of displaying a high-quality picture of a high uniformity while using a display device including pixels each divided into a plurality of sub-pixels having different areas, by removing a fluctuation of drive waveform (waveform applied to the display device) due to differences in area of the sub-pixels.

According to the present invention, there is provided a display apparatus comprising a multiplicity of pixels each divided into at least two sub-pixels having mutually different areas including a larger sub-pixel having a larger area and a smaller sub-pixel having a smaller area, wherein each sub-pixel is provided with a transparent electrode and a low-resistivity conductor connected to the transparent electrode, and the low-resistivity conductor for the larger sub-pixel has a lower resistance than the low-resistivity conductor for the smaller sub-pixel.

According to another aspect of the present invention, there is provided a display apparatus, comprising a group of scanning electrodes and a group if of data electrodes intersecting the scanning electrodes so as to form a sub-pixel at each intersection of the scanning electrodes and the data electrodes so that a plurality of the sub-pixels constitute a pixel in combination and the display apparatus is provided with a multiplicity of such pixels, wherein at least one of the group of scanning electrodes and the group of data electrodes includes a first-type electrode comprising a combination of a first transparent conductor film having a first area and a first low-resistivity conductor connected to the first transparent conductor film, and a second-type electrode comprising a combination of a second transparent conductor film having a second area smaller than the first area and a second low-resistivity conductor connected to the second transparent conductor film, and the first low-resistivity conductor has a lower resistance than the second low-resistivity conductor.

The above-mentioned display apparatus can provide a drive waveform delay characteristic uniform to all the (sub-)pixels even if all the pixels are driven by driver ICs having an identical drive performance or capacity, so that it is possible to provide a display having a high uniformity over an entire picture area.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5A–7A are partial plan views each showing a pixel engagement according to First, Second and Third embodiments, respectively, and FIGS. 5B–7B are corresponding partially enlarged views.

DESCRIPTION OF THE PREFERRED EMBODIMENTS

Figure 3:
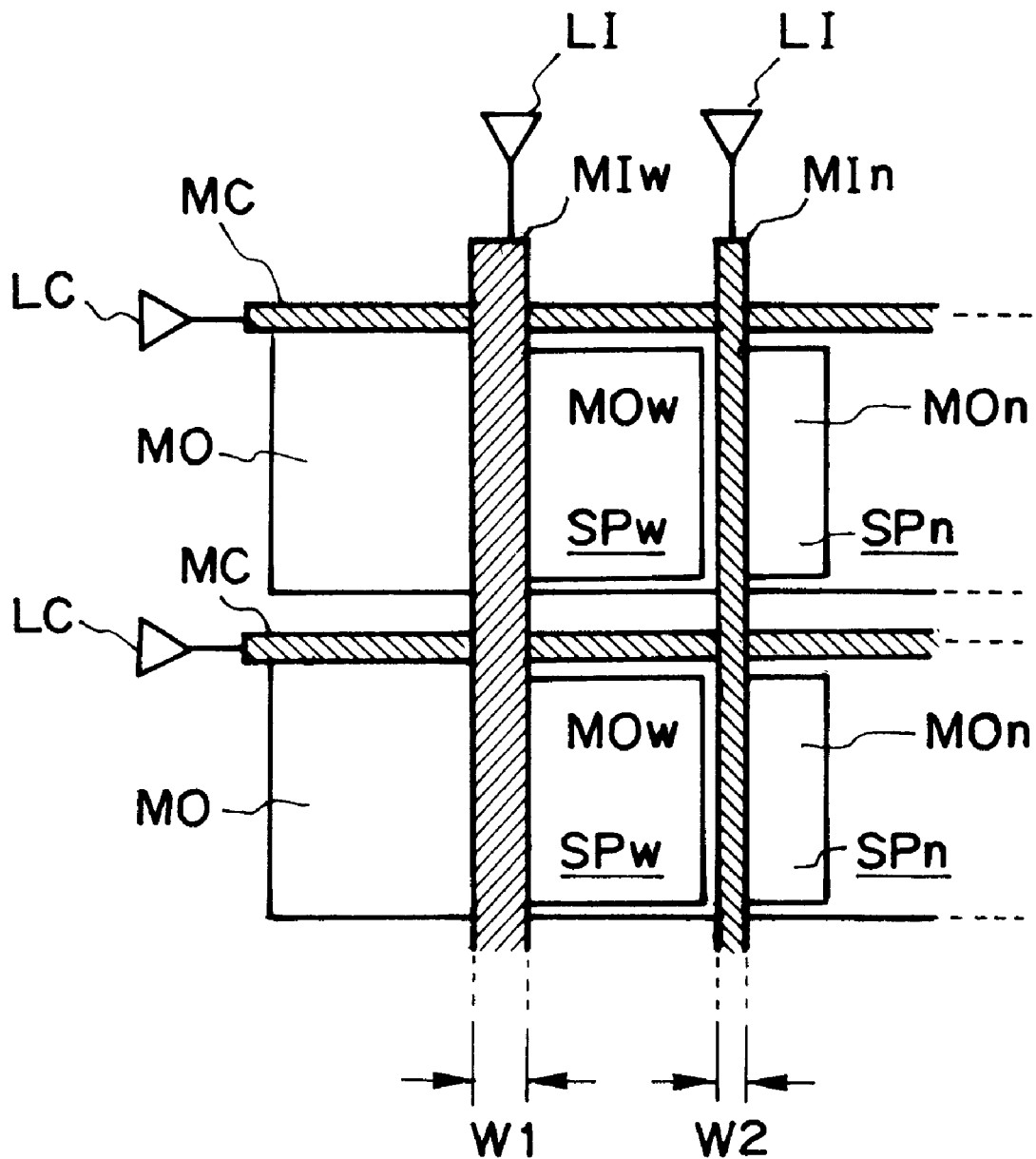
FIG. 3 is a partial plan view for illustrating an organization of pixels in a display apparatus (display panel) according to an embodiment of the invention.

FIG. 3 is a plan view showing a pixel arrangement according to a basic embodiment of the present invention.

FIG. 3 shows a display panel of a non-active (or simple) matrix-type. The display panel includes low-resistivity conductors MC functioning as scanning electrodes, to which are connected high-resistivity transparent electrodes MO. (Herein, the term "low-resistivity" and "high-resistivity" merely refer to relative values.) The low-resistivity conductors MC and associated transparent electrodes MO constituting the scanning electrodes are disposed on a common substrate.

On the other hand, the display panel further includes low-resistivity conductors MIw (wider) and MIn (narrower) functioning as data electrodes and high-resistivity transparent electrodes MOw and MOn connected to the low-resistivity conductors MIw and MIn, respectively. The low-resistivity conductors MIw and MIn and associated MOw and MOn constituting the data electrodes are disposed on another common substrate.

Each overlapping region SPw and SPn of a transparent electrode MO with a transparent electrode MOw or a transparent electrode MOn provides a sub-pixel (which may be regarded as being formed at an intersection of a scanning electrode MC and a data electrode MIw or MIn). Each transparent electrode MO is composed of a transparent conductor film in the form of a continuous stripe, and the transparent electrodes MOw and MOn are respectively composed of a stripe-form transparent conductor film separated into discrete segments.

In the embodiment shown in FIG. 3, two sub-pixels including a larger sub-pixel SPw and a smaller sub-pixel SPn are combined to form a pixel, and only two such pixels are shown in FIG. 3.

The data electrodes (data lines) MIw and MIn are led to data line terminals LI, and the scanning electrodes (scanning lines) are led to scanning line terminals LC, which are further connected to respective drive circuits.

The low-resistivity conductors MIw and MIn functioning as data electrodes have widths W1 and W2, respectively, which are different from each other. In this embodiment, a sub-pixel SPw composed of a transparent electrode MOw is larger than a sub-pixel SPn composed of a transparent electrode MOn. Accordingly, the conductor MIw has a width W1 which is larger than a width W2 of the conductor MIn. The conductors MIw and MIn have a substantially identical thickness, so that the conductors have resistances reversely proportional to their widths. Such conductors MIw and MIn may be formed through a common series of photolithographic step.

Herein, the resistance of a low-resistivity conductor refers to the resistance of the conductor along its entire length on a display device (panel) and should be determined inversely proportional to the total area of transparent electrodes connected to the conductor. In order to provide the desired resistance, it is preferred to dispose a low-resistivity conductor in a uniform thickness and a uniform width along its entire length, so that the resistance thereof per unit length along its extension is determined based on a size of transparent electrode(s) connected to the conductor.

Corresponding to the above arrangement, the conductors MIw and MIn should have a width ratio of $2^n$ (n: integer)

therebetween if the sub-pixels SPw and SPn have an areal ratio of $2^n$ therebetween.

In the embodiment of FIG. 3, the sub-pixels SPw and SPn have an areal ratio of 2:1 therebetween so that the conductors MIw and MIn are designed to have widths W1 and W2 in a ratio of 2:1.

The low-resistivity conductor (such as MC, MIw and MIn) used in the present invention may for example comprise a metal, such as Al, Cr, Ni, Ti, Cu, Ta, W or Mo, or CrN, or Ag-containing aluminum oxide and may basically comprise any material having a lower resistivity than a transparent electrode. The low-resistivity conductor may preferably have a resistivity which is at most 1/100, more preferably at most 1/1000, of that of the transparent electrode material.

On the other hand, the transparent electrode may for example comprise tin oxide, indium oxide, ITO, ZnO or IrO.

It is possible to arrange a number of pixels each comprising sub-pixels as shown in FIG. 3 and dispose a color filter to each (sub-) pixel, thereby constituting a color display device. Particularly, in case of disposing a color filter surrounded by a light-intercepting masking portion, the area of a sub-pixel is optically determined as that of a light-transmitting color filter portion. Moreover, for the purpose of the present invention, the resistances of the conductors should be determined based on the area of the transparent electrodes MOw and MOn and not on the areas of the light-transmitting color filter portions of the sub-pixels.

The pixel arrangement according to the present invention may preferably be adopted to constitute a liquid crystal device including (sub-) pixels each comprising a pair of transparent electrodes and a liquid crystal disposed therebetween.

As the liquid crystal, it is preferred to use a ferroelectric or anti-ferroelectric chiral smectic liquid crystal showing two orientation states, or a chiral nematic liquid crystal showing two metal-stable states. The device using the former type of liquid crystal is known as an FLCD or AFLCD, and the device using the latter type of liquid crystal is known as a BTNLCD.

The present invention is applicable not only to a non-active matrix-type device as described above but also to an active matrix-type device.

Hereinbelow, some specific embodiments of the display apparatus according to the present invention will be described with reference to drawings.

(First embodiment)

Figure 4:
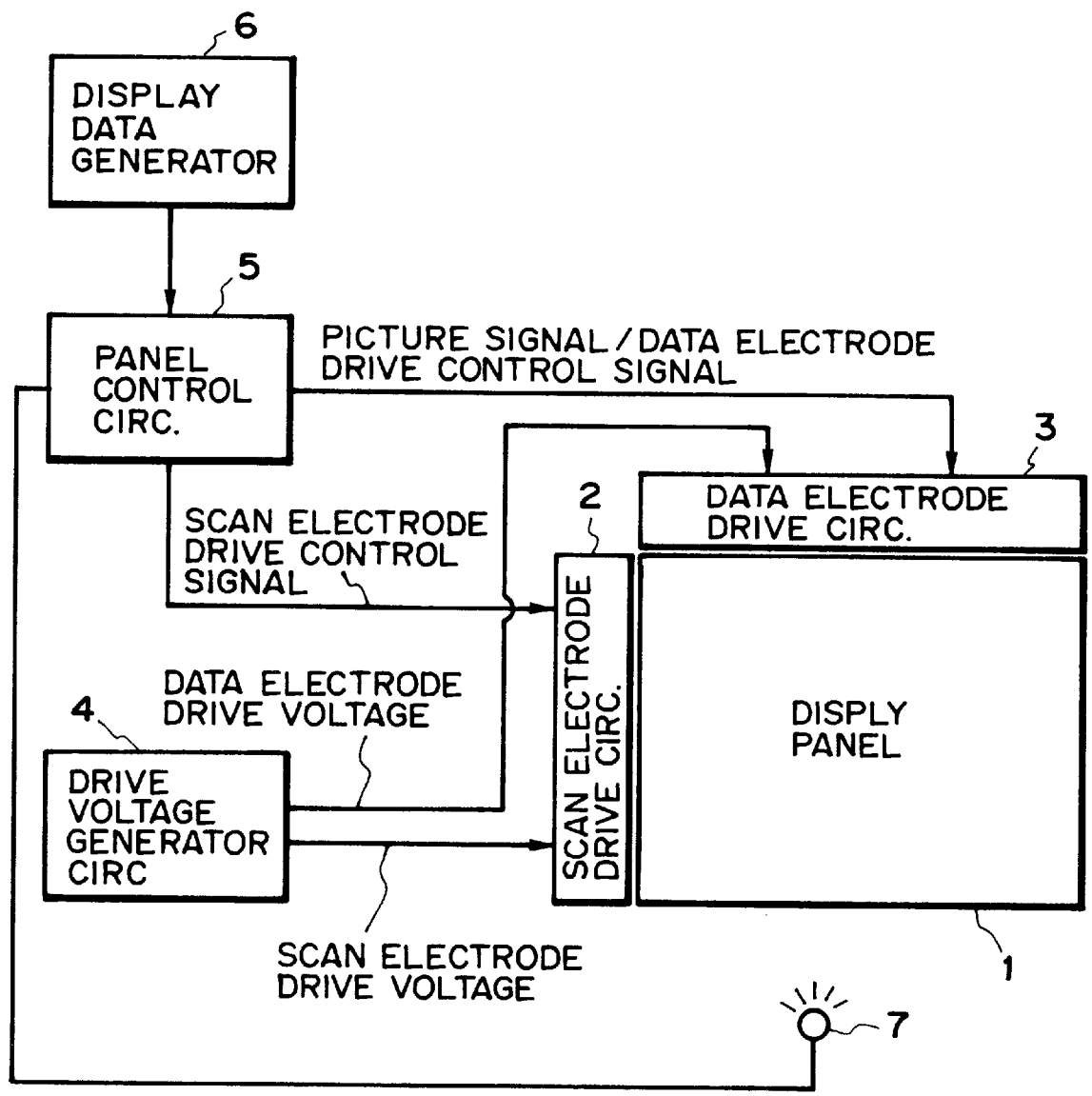
FIG. 4 is a block diagram of a display apparatus including a control system according to First embodiment of the invention.
Figure 5A:
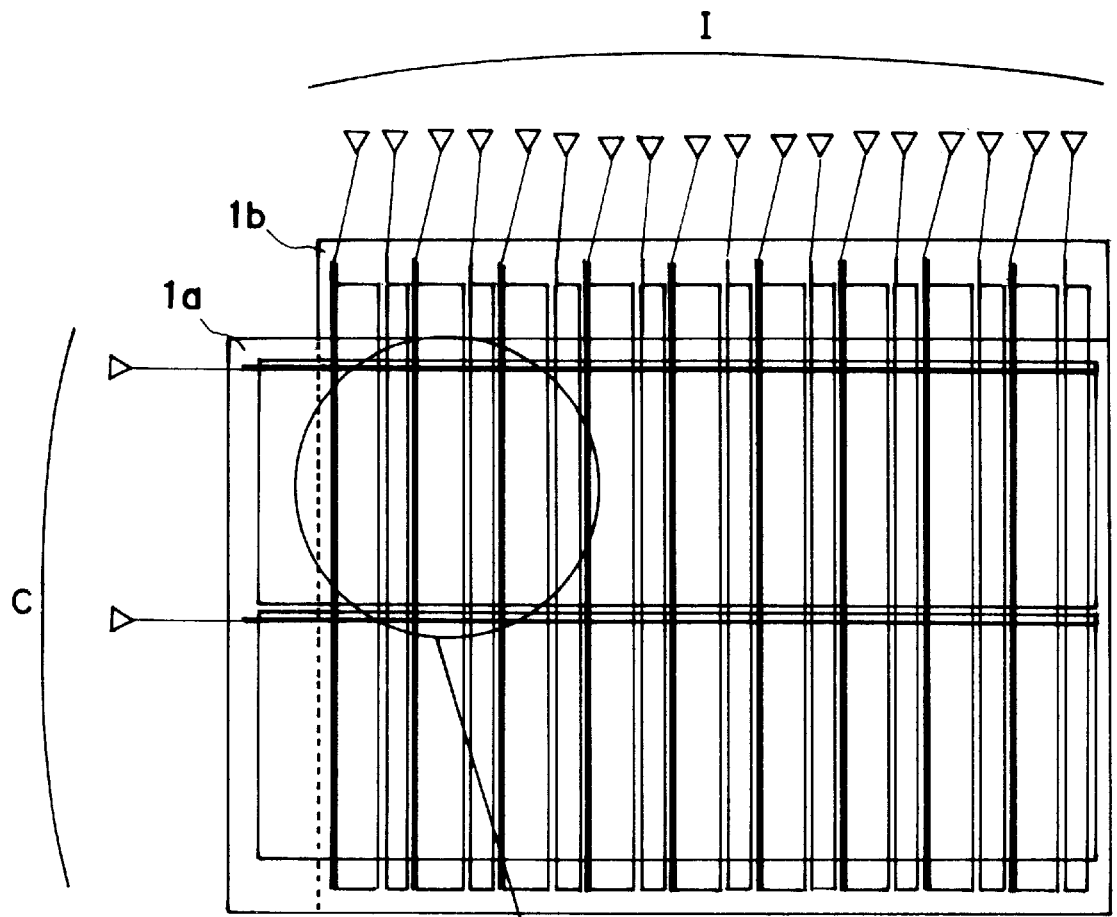

FIG. 4 is a block diagram of a display apparatus including a drive control system. Referring to FIG. 4, the display apparatus includes a liquid crystal display device (panel) 1 (which comprises a substrate 1a having thereon a group of scanning electrodes C, and a substrate 1b having thereon a group of data electrodes I disposed opposite to the substrate 1a as shown in FIG. 5A); and a drive system for the display device including a scanning electrode drive circuit 2 for driving the scanning electrodes C, a data electrode drive circuit 3 for driving the data electrodes I, a drive voltage generating circuit 4 for supplying drive voltages to the respective drive circuits, a panel control circuit 5 for supplying a scanning electrode drive control signal to the scanning electrode drive circuit 2 and supplying a data electrode drive control signal and picture signals to the data electrode drive control circuit 3, and a display data generating circuit 6 for supplying picture data to the panel control circuit 5. The display panel 1 is illuminated by a light source 7 which is also controlled by the panel control circuit 5. The light source 7 may comprise a fluorescent lamp, such as a three-wavelength tube.

FIG. 5A is a schematic plan view for illustrating an arrangement of electrodes and (sub-) pixels in the liquid crystal display device 1 described above, and FIG. 5B is a partially enlarged view thereof showing one full-color pixel. In this embodiment, the display device 1 comprises a ferroelectric liquid crystal display device. FIG. 5A only shows totally 6 full-color pixels including three pixels disposed in the data electrode-arrangement direction (i.e., along the extension of a scanning electrode) and two pixels disposed in the scanning electrode-arrangement direction (i.e., along the extension of data electrodes), but the display device 1 actually includes 1280×1024 full-color pixels each comprising three color pixels of R, G and B.

Figure 5B:
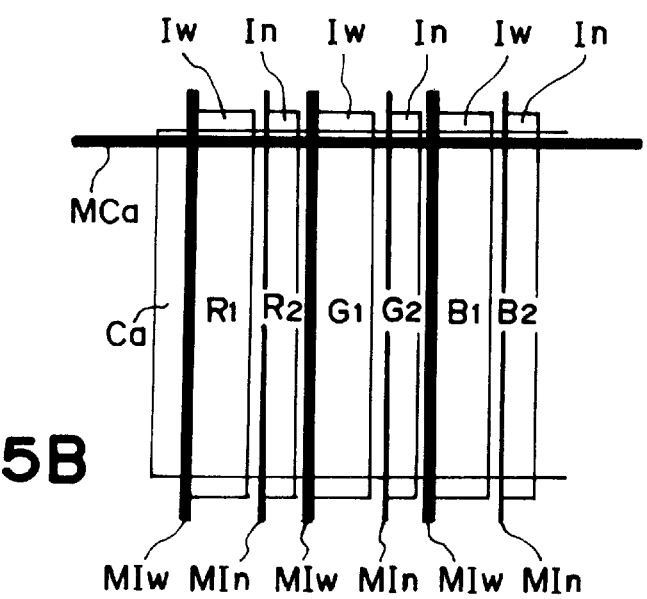

As shown in FIGS. 5A and 5B, each color pixel in the liquid crystal display device 1 in this embodiment comprises two sub-pixels having an areal ratio therebetween of 2:1 and is provided with a color filter of R, G or B so as to provide a color display device. For each color pixel of R, G or B, a data electrode is divided into two data electrodes Iw and In having mutually different widths, and a scanning electrode Ca is not divided longitudinally or laterally. As a result, it is possible to display colors of 2 bits (four gradation levels) for each color and colors of 6 bits (64 ways) for one full-color pixel.

As shown in FIG. 5B, metal conductors (low-resistivity conductors) MIw and MIn are disposed so as to lower the resistances of the data electrodes Iw and In. As described above, each color pixel of R, G and B has divided data electrodes Iw and In. In order to realize a linear gradational display, the data electrodes Iw and In are designed to have areas satisfying Iw>In and in a ratio of 2:1. Accordingly, the electric capacitance per data electrode is larger for Iw in a ratio of 2:1 with respect to In. Accordingly, in this embodiment the resistances of the metal conductors MIw and MIn are designed to satisfy MIw<MIn, more specifically a ratio of 1:2. As a result, each data electrode is caused to have an identical electrical load (in terms of Ci×Ri, wherein Ci represents a capacitance of a data electrode i and Ri represents a resistance of the data electrode i). Strictly speaking, a transparent electrode contributes to a reduction in resistance to some extent. However, in an ordinary case of using, e.g., a transparent electrode of ITO and a metal conductor of Al in ordinary thicknesses so as to provide a sub-pixel of an ordinary aperture rate, 90% or more of the total resistance is governed by the resistance of the metal conductor. For this reason, the resistances of the metal conductors MIw and MIn are simply set to be in a ratio of 1:2 in this embodiment. As a result, even such two sub-pixels having different areas provide an identical electrical load per data electrode for a drive circuit, thus providing an identical drive waveform delay characteristic, i.e., an identical pixel drive condition, to realize a high-quality display free from irregularity over an entire picture area.

This embodiment can be modified so that the electrodes I are used as scanning electrodes and the electrodes C are used as data electrodes.

(Second embodiment)

Figure 6A:
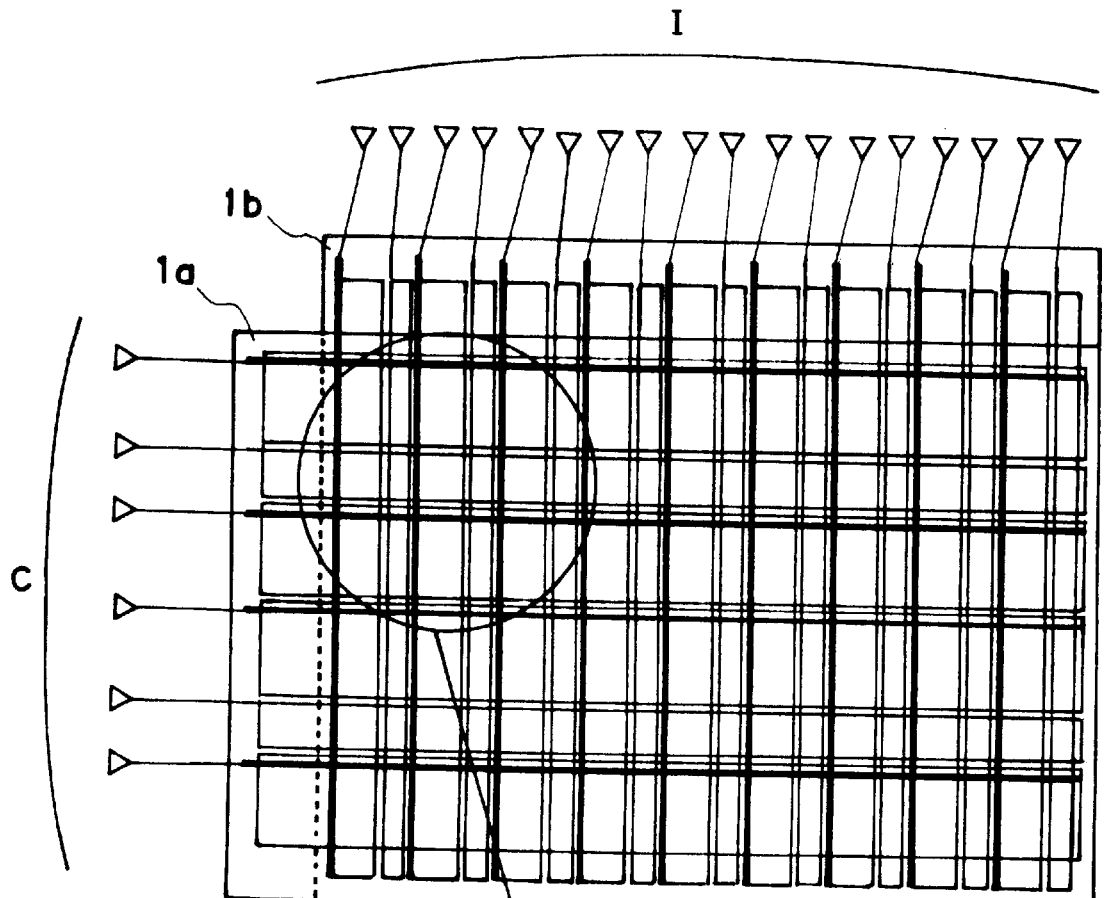
Figure 6B:
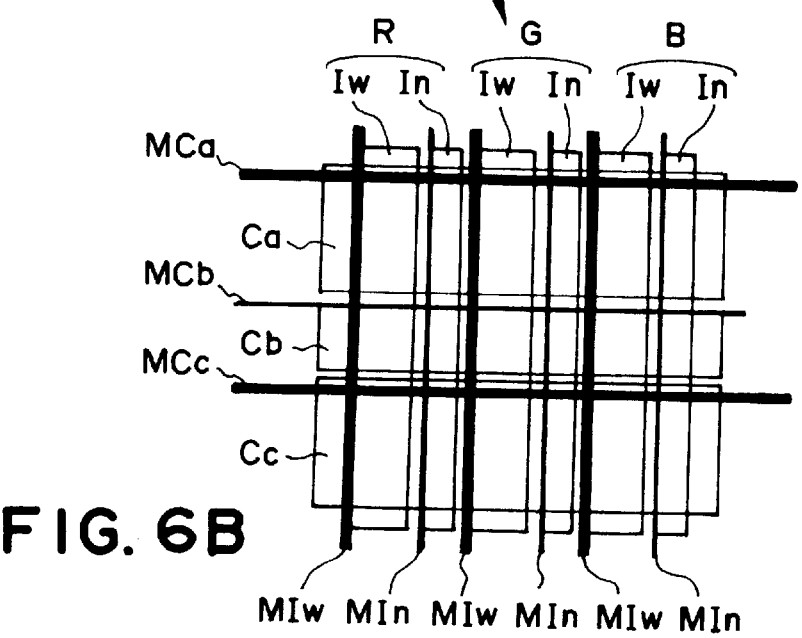

FIG. 6A is a schematic plan view for illustrating an arrangement of electrodes and (sub-) pixels in a liquid crystal display device according to this embodiment, and FIG. 6B is a partially enlarged view thereof showing one full-color pixel.

Figure 1A:
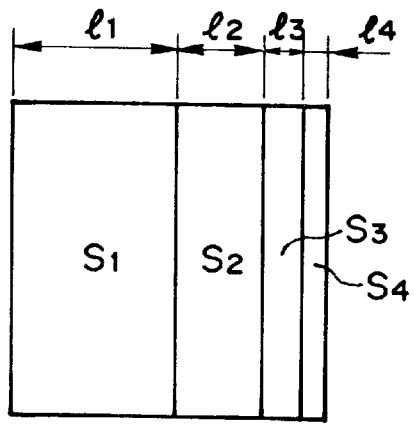
FIGS. 1A–1C respectively show an example of sub-pixel arrangement in a pixel (display element) for gradational display.
Figure 1B:
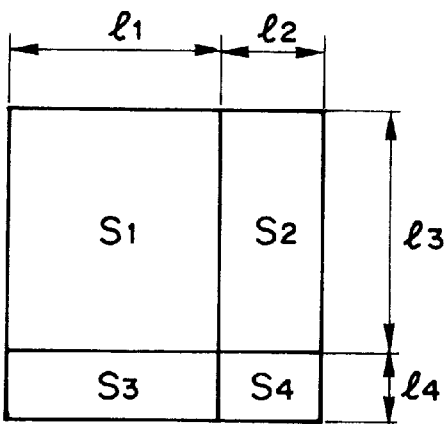
Figure 1C:
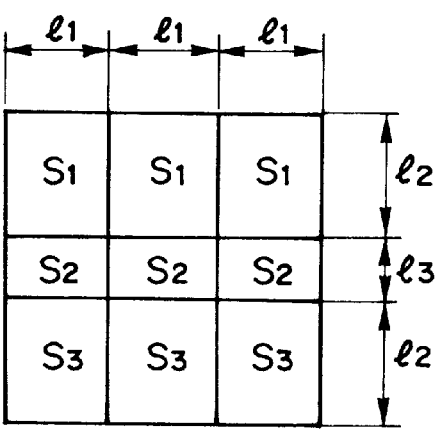

As shown in FIGS. 6A and 6B, in this embodiment, each pixel is designed to have a sub-pixel arrangement similar to the one shown in FIG. 1C so as to avoid a false contour phenomenon by retaining a light quantity gravity center always at a center of a pixel even at varying gradation levels. Strictly speaking, each color pixel of R, G or B causes a slight shift of gravity center in a horizontal direction (along a scanning electrode) at varying gradation level. However, the degree of the shift is small relative to the entire pixel, so that the shift is substantially free of problem in this embodiment. (It is also possible to adopt a sub-pixel arrangement pattern as shown in FIG. 1C so as to avoid a shift of gravity center in all directions.) In each pixel of R, G or B, a data electrode is divided into two electrodes Iw and In having different widths, and a scanning electrode is divided into three electrodes Ca, Cb and Cc, among which the electrodes Ca and Cc are electrically short-circuited with each other so as to be supplied with a scanning electrode drive signal simultaneously, so that a scanning electrode is divided into two electrodes. As a result, it is possible to display colors of 4 bits (16 gradation levels) for each color and colors of 12 bits (4096 ways) for one full-color pixel shown in FIG. 6B in this embodiment.

Also in this embodiment, similarly as in First embodiment, the metal conductors MIw and MIn (for data electrodes) are designed to have resistances inversely proportional to the areas of the sub-pixels Iw and In. More specifically, the sub-pixels Iw and In for data electrodes are designed to have an areal ratio of 2:1 in this embodiment, so that the resistance of MIw is designed to be ½× the resistance of MIn. In this embodiment, the resistance of the metal conductor MCa is designed to be equal to that of the metal conductor MCc and ½ that of the metal conductor MCb.

In this embodiment, both the scanning electrodes C and the data electrodes I are provided with two types each of low-resistivity conductors MCa (=MCc) and MCb and low-resistivity conductors MIw and MIn. However, an ordinary display apparatus is longer in a horizontal scanning direction and uses a scanning electrode drive signal having a larger amplitude than a data electrode drive signal, so that the deformation of a scanning electrode drive signal is liable to be pronounced compared with that of a data electrode drive signal.

Accordingly, in the case where each of a scanning electrode and a data electrode uses two or more types of transparent conductor films having different areas (or widths), it is preferred to provide low-resistance conductors having different resistances at least to the scanning electrodes.

(Third embodiment)

Figure 7A:
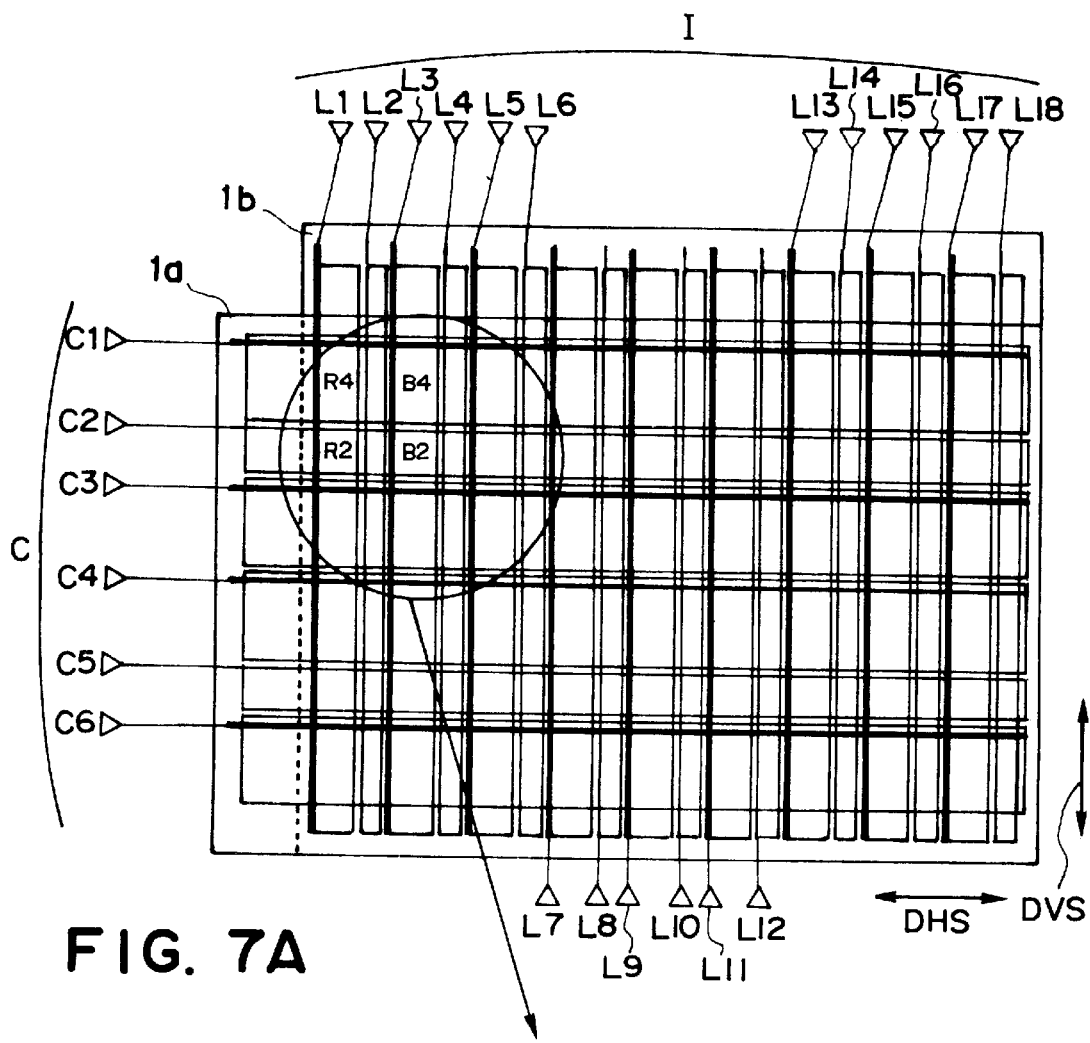
Figure 7B:
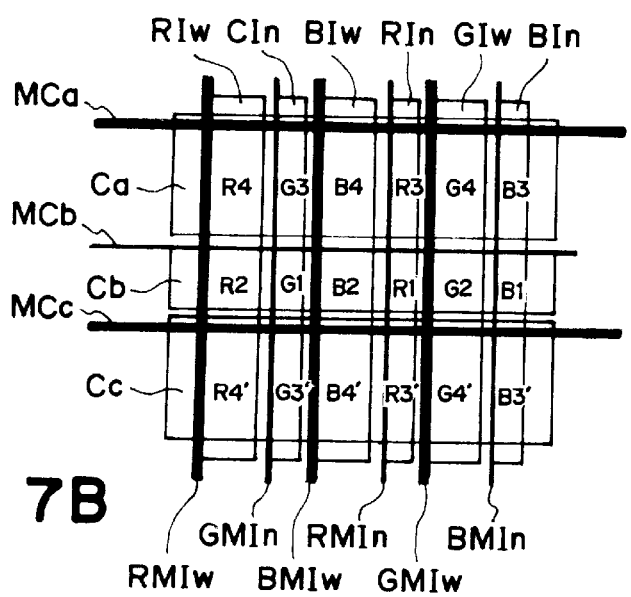

FIG. 7A shows a sub-pixel arrangement pattern obtained by modifying that shown in FIG. 6A of Second embodiment, and FIG. 7B is a partially enlarged view thereof showing one full-color pixel.

More specifically, along a horizontal scanning direction DHS shown in FIG. 7A, the sub-pixels are arranged repetitively in an order from the left of red sub-pixels (R4, R2, R4'), green sub-pixels (G3, G1, G3'), blue sub-pixels (B4, B2, B4'), red sub-pixels (R3, R1, R3'), green sub-pixels (G4, G2, G4') and blue sub-pixels (B3, B1, B3'). By using this sub-pixel arrangement pattern, a gradational display at 16 gradation levels for each color may be performed. Referring to a case of red display for example in the gradational display mode, sub-pixels R4 and R4' assume an identical display state at a time, and sub-pixels R3 and R3' assume an identical display state at a time.

In order to realize the above-mentioned display condition while providing a high one vertical-scanning velocity, the terminals C1 and C3 are simultaneously supplied with a scanning selection signal to simultaneously select scanning electrodes connected thereto.

Then, the terminals C4 and C6 are simultaneously supplied with a scanning selection signal to simultaneously select the scanning electrodes connected thereto.

The above-mentioned two-scanning electrode simultaneous selection is sequentially performed in a vertical scanning direction DVS to complete one vertical scanning operation.

Then, in a subsequent vertical scanning period, scanning electrodes connected to terminals $C_2, C_5, \ldots C_{3n+2}, \ldots$ are sequentially supplied with a scanning selection signal to be selected one at a time.

Accordingly, a gradational display may be performed by selecting ON and OFF states of independently controllable four sub-pixels R2, a combination of sub-pixels R3 and R3', and a combination of sub-pixels R4 and R4', which provide areal ratios of 1:2:4:8.

Gradational display for other colors of green and blue may be performed similarly as the red gradational display described above.

Input terminals L1–L6, L7–L12 and L13–L18 for data electrodes are connected to metal conductors (low-resistivity conductors) RMIw, GMIw, BMIw, RMIn, GMIw and BMIn, respectively.

The terminals L1–L6 and L13–L18 are connected to a drive circuit (not shown) disposed on one side of the display panel, and the terminals L7–L12 are connected to a drive circuit (not shown) disposed on the other side of the display panel.

According to the above-described arrangement, it is possible to lower the disposition density of terminals.

The metal conductors RMIw, GMIw and BMIw have a resistance which is half that of the metal conductors RMIn, GMIn and BMIn, and the metal conductors MCa and MCc each have a resistance which is half that of the metal conductor MCb.

The above-described resistances are provided by forming the respective metal conductors in an identical thickness and in different widths.

Figure 8:
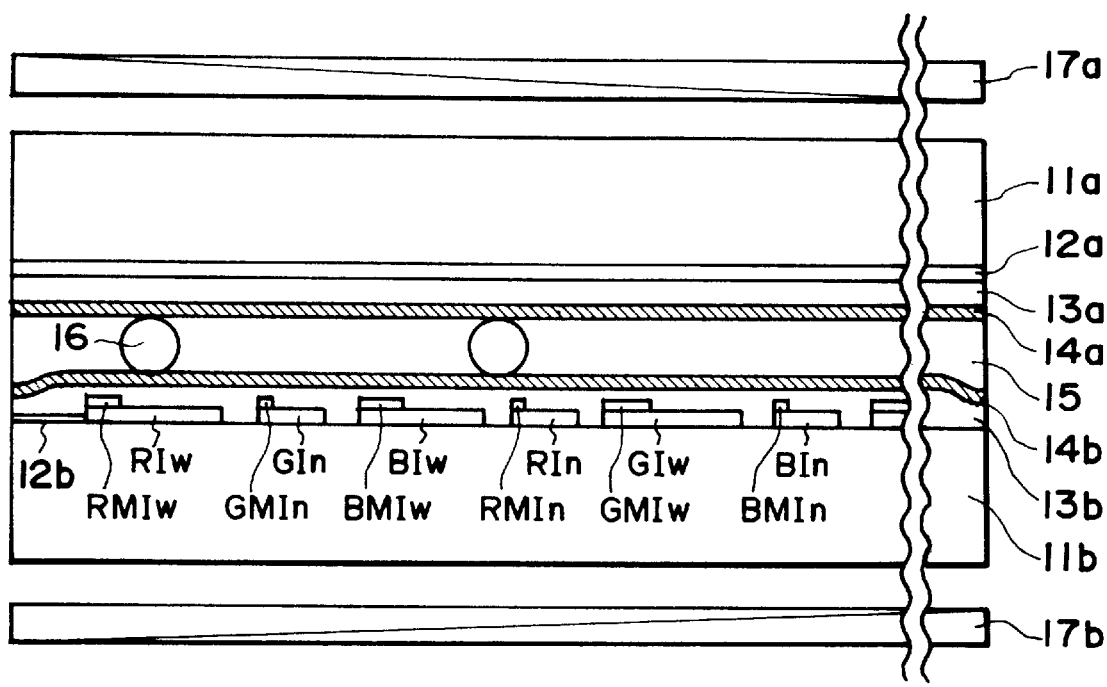
FIG. 8 is a schematic sectional view of a display panel (display device) which may be used in the invention.

FIG. 8 is a schematic sectional view of a display panel according to this embodiment.

More specifically, the display panel is formed by disposing a liquid crystal 15 between a pair of substrates 11a and 11b. The inner surface of the substrate 11a is provided with a patterned transparent conductor film 12 (transparent electrodes Ca, Cb or C, each provided with a metal conductor MCa, MCb or MCc shown in FIG. 7 but not shown in FIG. 8), an optionally provided insulating film 13a and an alignment film 14a.

On the other hand, the inner surface of the substrate 11b is provided with a patterned transparent conductor film 12b (i.e., transparent electrodes RIw, GIn, BIw, RIn, GIw and BIn) provided with metal conductors RMIw, GMIw, BMIw, RMIn, GMIw and BMIn, respectively, an optionally provided insulating film 13b, and an alignment film 14b. The substrates 11a and 11b are disposed with a constant gap therebetween on the order of 1–10 μm by dispersing spacer beads 16 therebetween to form a cell (panel) structure, which is sandwiched between a pair of polarizers 17a and 17b to provide a display panel.

(Fourth embodiment)

Figure 9:
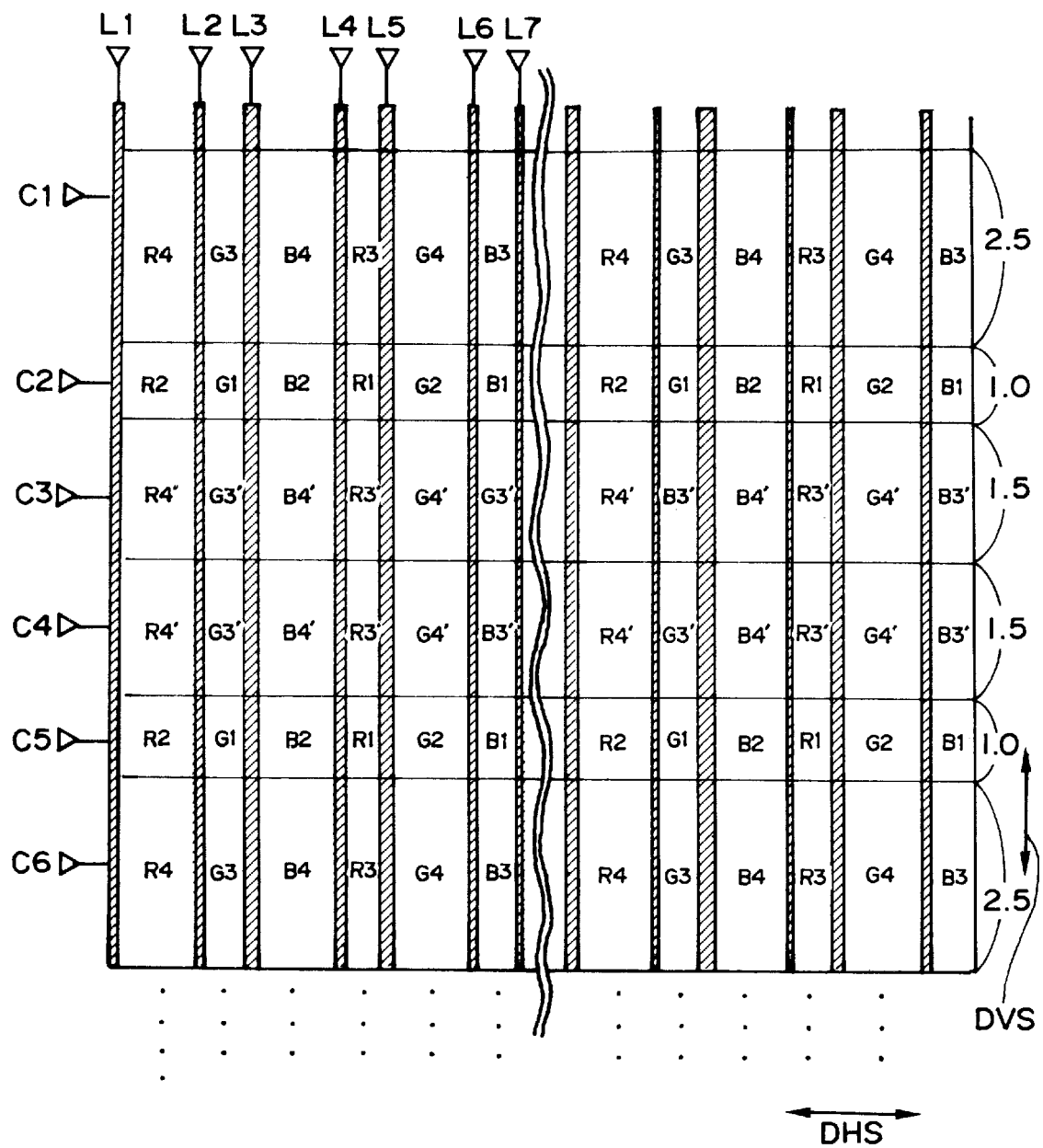
FIG. 9 is a partial plan view showing a pixel arrangement according to Fourth embodiment of the invention.
Figure 2:
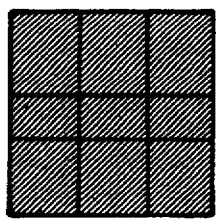
Figure 2:
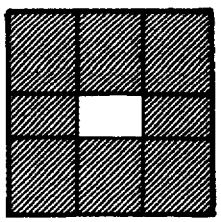
Figure 2:
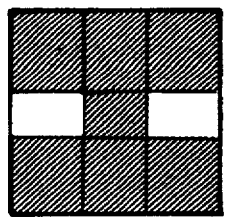
Figure 2:
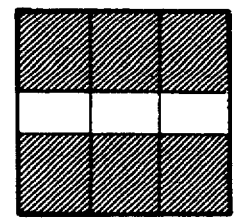
Figure 2:
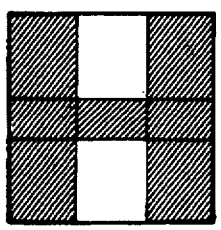
Figure 2:
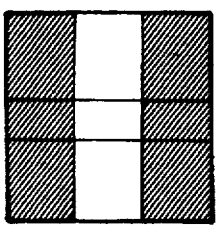
Figure 2:
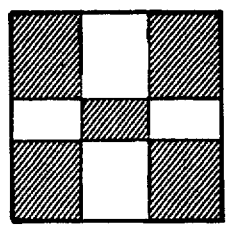
Figure 2:
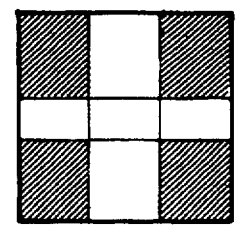
Figure 2:
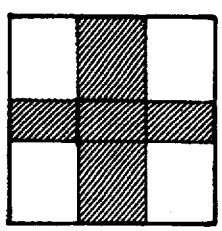
Figure 2:
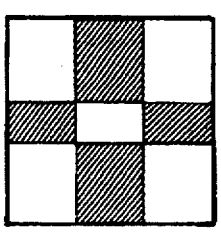
Figure 2:
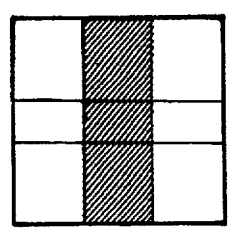
Figure 2:
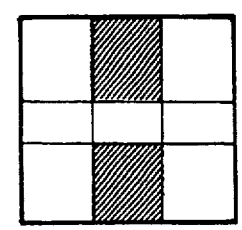
Figure 2:
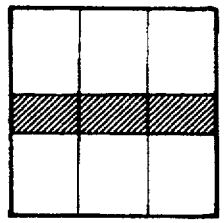
Figure 2:
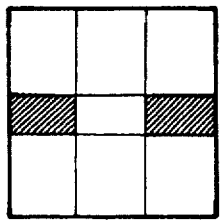
Figure 2:
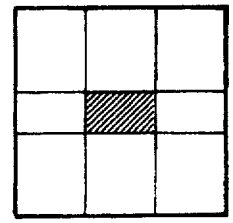
Figure 2:
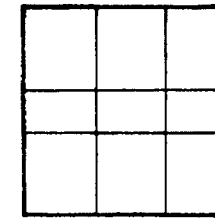
Figure 4:
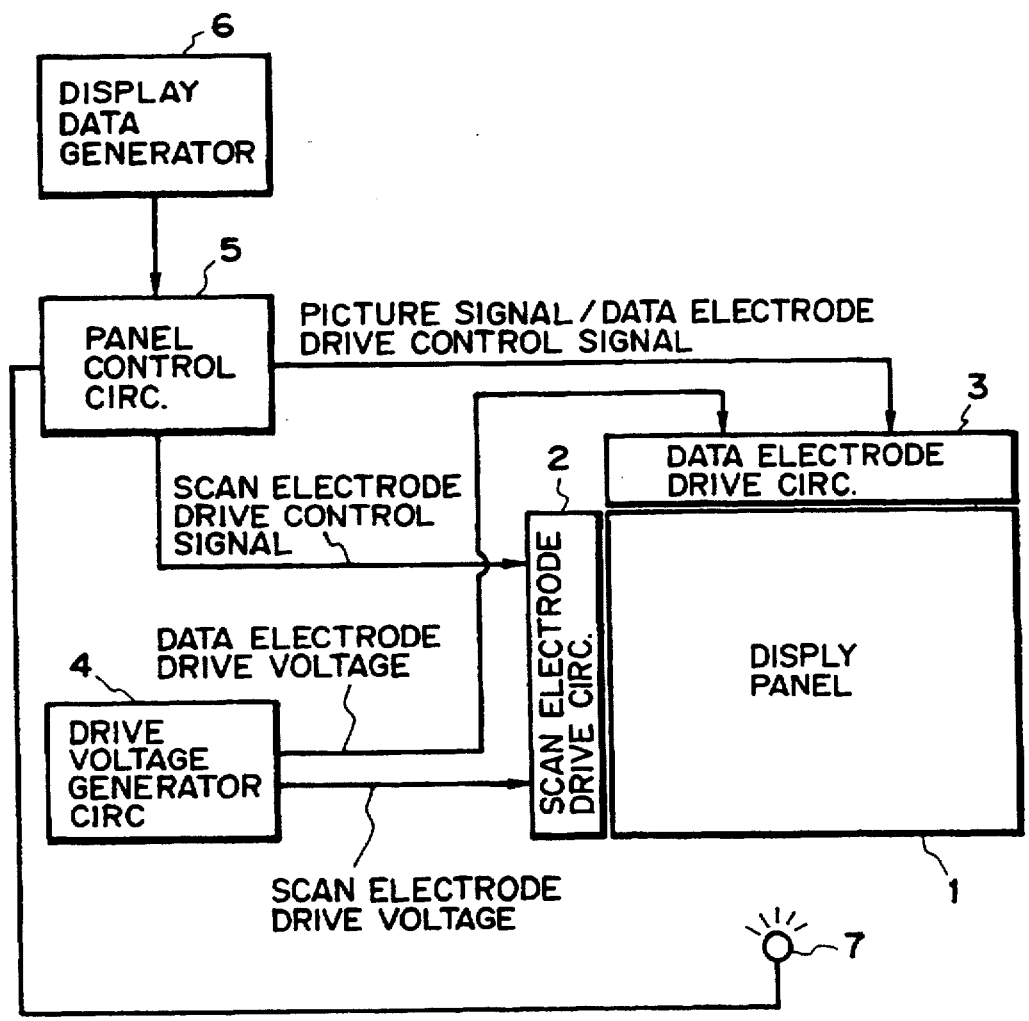
Figure 6A:
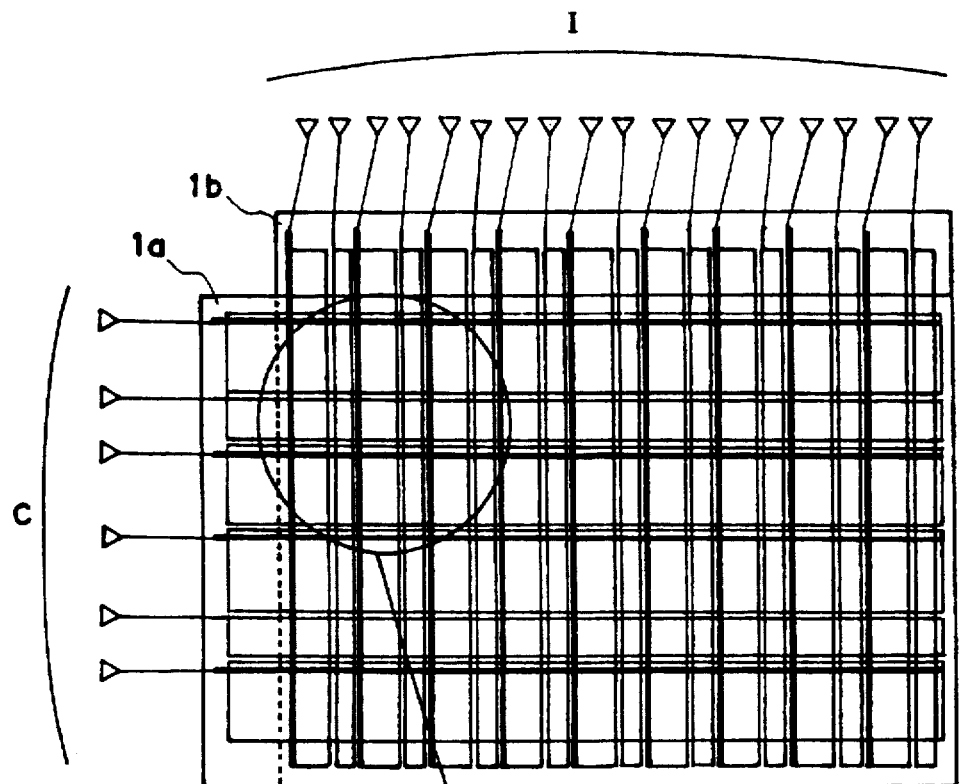
Figure 6B:
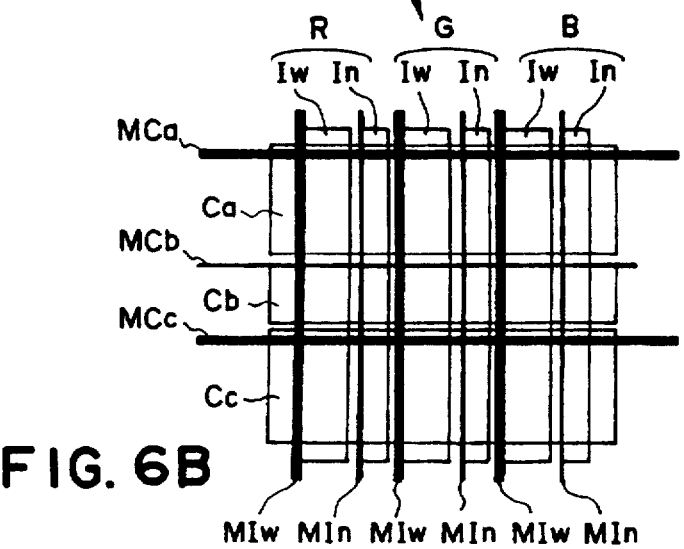
Figure 8:
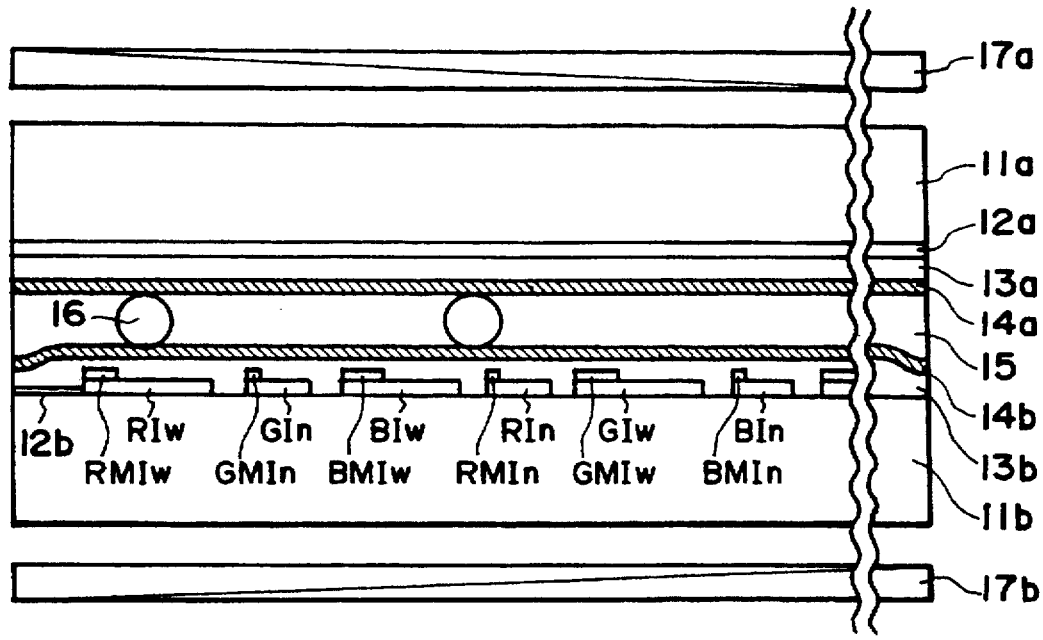

FIG. 9 shows a sub-pixel arrangement pattern obtained by changing areal ratios among sub-pixels in the pattern shown in FIG. 7A. More specifically, in this embodiment, the scanning electrodes having relative widths of 2.5:1.0:1.5:1.5:1.0:2.5 are arranged in this order and the pattern is repeated in the vertical scanning direction DVS.

The display panel according to this embodiment allows an image display according to two display modes having different resolutions and numbers of displayable gradation levels.

First, a red display according to a low-resolution and high gradational display mode will be described. In this display mode, similarly as in the mode of Third embodiment described above, first a scanning selection signal is simultaneously applied to scanning electrodes connected to terminals C1 and C3 to determine the display states of sub-pixels R4, R4', R3 and R3' on the two scanning electrodes.

Then, a scanning selection signal is simultaneously applied to terminals C4 and C6 to determine the display states of sub-pixels R4', R4, R3' and R3.

After repeating the above-mentioned two-line simultaneous writing to complete a first vertical scanning, terminals $C_2$, $C_5$ . . . $C_{3n+2}$ . . . are sequentially supplied with a scanning selection signal to effect a second vertical scanning. One frame scanning is effected by the first and second vertical scannings.

Next, a high resolution—low gradation display mode will be described. A certain pixel in this mode is composed of three sub-pixels R4, G3 and B4 unlike a pixel for the above-mentioned low resolution—high gradation mode. Another pixel next to the above-mentioned certain pixel in the horizontal scanning direction DHS is composed of three sub-pixels R3, G4 and B3. Another pixel next to the above-mentioned certain pixel in the DVS direction is composed of 6 sub-pixels R2, R4', G1, G3', B2 and B4', and a further adjacent pixel in the DVS direction is composed of 6 sub-pixels R4', R2, G3', G1, G4' and B2.

According to this display mode, totally 72 sub-pixels shown in FIG. 9 allow a display for 16 pixels. The same number of sub-pixels allow a display for only 4 pixels according to the above-mentioned low resolution—high gradation display mode. The high resolution—low gradation mode is suitable for displaying characters, such as alphabets, numerals and Japanese characters, for which a smooth contour display is thought more of than a number of displayable gradation levels.

A scanning selection signal may be applied sequentially in the order of terminal C1, terminals C2 and C3, terminals C4 and C5, and terminal C6 to effect a one-frame scanning in a non-interlaced manner.

By disposing two low-resistivity conductors having different resistances alternately and three color sub-pixels sequentially and alternately as described above, it is possible to effect a display at two display modes at least in a horizontal scanning direction.

Further, if the lengths (i.e., pixel division ratios) of sub-pixels in the vertical scanning direction are made different from each other for three sub-pixels in the vertical scanning direction, and the area of a sub-pixel having the largest area in the DVS direction is made substantially equal to the total area of the remaining sub-pixels, it is possible to effect a display at two display modes also in the vertical scanning direction.

(Fifth embodiment)

As a specific embodiment, a display panel having a pixel arrangement pattern shown in FIG. 9 and a sectional structure shown in FIG. 8 was prepared in the following manner.

One glass substrate 11b of 240 mm×200 mm was coated with a 1500 Å-thick ITO film by sputtering and then with a 1500 Å-thick molybdenum (Mo) film by sputtering, followed by patterning of the Mo film into stripes of 20 μm and 15 μm disposed alternately by photolithography and patterning of the ITO film into stripes of 200 μm and 100 μm, respectively, disposed alternately.

A 220 mm-long stripe electrode formed by a superposition of the 100 μm-wide ITO stripe and the 10 μm-wide Mo stripe exhibited a resistance of 3.0 kΩ, and a stripe electrode of an equal length comprising a superposition of the 200 μ-wide ITO stripe and the 20 μm-wide Mo stripe exhibited a resistance of 1.5 kΩ.

Then, the stripe electrodes were coated with an insulating film 13b of tantalum oxide and an alignment film 14b of polyimide.

On the other hand, an upper glass substrate 11a was similarly provided with stripes formed in width ratios of 2.5:1.0:1.5 superposed with Mo stripes of 25 μm, 10 μm and 15 μm, respectively, in width, and further coated with a tantalum oxide insulating film 13a and a polyimide alignment film 14a.

The polyimide alignment films 14a and 14b on the substrates 11a and 11b were respectively subjected to a rubbing treatment in one direction.

Then, 1.2 μm-dia. silica spacer beads were dispersed on one glass substrate 11a, an epoxy resin adhesive was applied onto a periphery of the other glass substrate 1b, and the two substrates were applied to each other so that their rubbed directions were substantially parallel to each other (more specifically at an intersection angle θc satisfying 0<θc<20 degs.), to form a blank panel (cell).

Then, the blank panel was filled with a phenyl pyrimidine-type ferroelectric liquid crystal showing the following physical properties including a phase transition series heated into isotropic phase by utilizing a capillary phenomenon, followed by gradual cooling to room temperature, to form a liquid crystal display panel. According to an observation through a polarizing microscope, the liquid crystal in the panel exhibited a uniform alignment state.

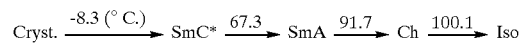

Cryst. $\xrightarrow{-8.3\,(^\circ C.)}$ SmC* $\xrightarrow{67.3}$ SmA $\xrightarrow{91.7}$ Ch $\xrightarrow{100.1}$ Iso Tilt angle (H)=15.1 deg. (at 30° C.)

Spontaneous polarization Ps=5.5 (nc/cm²)

(at 30° C.)

The thus-prepared display panel was subjected to a matrix drive in a well-known manner by using drive signals of well-known waveform, whereby it was possible to effect a display free from luminance difference between individual electrodes.

On the other hand a comparative display panel was prepared in quite the same manner as above except that the Mo stripes formed on both substrates were all formed in a constant with of 20 82 m. As a result of a similar matrix drive, the comparative display panel resulted in a display state wherein a luminance difference was observed alternately between individual electrodes.

(Sixth embodiment)

As a specific embodiment, a display panel having a pixel arrangement pattern as shown in FIGS. 7A and 7B (similarly as in Third embodiment) was prepared in the following manner.

A pair of glass substrates each in a size of 240 mm×300 mm were provided, and one glass substrate was coated with a 2 µm-thick Mo film by magnetron sputtering. After annealing, the Mo film was patterned by photolithography into Mo stripe conductors including 290 mm-long and 9 µm-wide conductors MCb (resistance: 800 ohm) and 230 mm-long and 18 µm-wide conductors MCa and MCc (resistance: 400 ohm), and thereon a 1500 α-thick ITO film was formed and patterned into stripe electrodes Ca, Cb and Cc to prepare a scanning electrode plate 1a.

The other glass substrate was coated with a 1500 α-thick ITO film which was patterned into stripe electrodes. Then, a 2500 α-thick Mo film was formed thereon and patterned into Mo conductors including 11 µm-wide conductors RMIw, BMIw, and GMIw and 9 µm-wide conductors GMIn, RMIn and BMIn to form a data electrode plate 1b.

By using the above-prepared two electrode plates, a liquid crystal panel was prepared otherwise in the same manner as in fifth embodiment.

As described above, according to the present invention, it has become possible to provide a display apparatus including a display panel, which comprises a multiplicity of pixels each divided into a plurality of sub-pixels having different areas, and capable of displaying a high-quality picture of a high uniformity and free from fluctuation due to different areas or loads of the sub-pixels on transmission of drive waveform applied to the display panel.

Further, it has become unnecessary to provide plural types of driver ICs having different drive performances adapted to different sizes (loads) of the (sub-) pixels of the panel.

What is claimed is:

1. A display apparatus comprising a multiplicity of pixels each divided into at least two sub-pixels having mutually different areas including a larger sub-pixel having a larger area and a smaller sub-pixel having a smaller area, wherein each sub-pixel is provided with a transparent electrode and a low-resistivity conductor connected to the transparent electrode, and the low-resistivity conductor for the larger sub-pixel has a lower resistance than the low-resistivity conductor for the smaller sub-pixel to provide an identical driven waveform delay characteristic.

2. A display apparatus according to claim 1, wherein the resistances of the low-resistivity conductors for the larger and smaller sub-pixels have a ratio therebetween which is inversely proportional to a ratio between the areas of the larger and smaller sub-pixels.

3. A display apparatus according to claim 1, wherein each pixel is designed to have a display state depending on an orientation state of a chiral nematic liquid crystal or a chiral smectic liquid crystal disposed thereat.

4. A display apparatus according to claim 1, wherein the low-resistivity conductor comprises a metal having a resistivity lower than that of the transparent electrode.

5. A display apparatus according to claim 1, wherein the low-resistivity conductors have widths which vary depending on the areas of the sub-pixels associated therewith.

6. A display apparatus according to claim 5, wherein the low-resistivity conductors for all the sub-pixels have an identical thickness.

7. A display apparatus according to claim 1, wherein each pixel is divided into at least three sub-pixels having mutually different areas including a largest sub-pixel having a largest area, a medium sub-pixel, having a medium area and a smallest sub-pixel having a smallest area, and the respective sub-pixels are provided with low-resistivity conductors having different resistances such that the low-resistivity conductor for the largest sub-pixel has a lowest resistance and low-resistivity conductor for the smallest sub-pixel has a highest resistance.

8. A display apparatus according to claim 7, wherein the low-resistivity conductors for the respective sub-pixels have resistances which are inversely proportional to the areas of the sub-pixels.

9. A display apparatus according to claim 7, wherein each pixel is designed to have a display state depending on an orientation state of a chiral nematic liquid crystal or a chiral smectic liquid crystal disposed thereat.

10. A display apparatus according to claim 7, wherein the low-resistivity conductor comprises a metal having a resistivity lower than that of the transparent electrode.

11. A display apparatus according to claim 7, wherein the low-resistivity conductors have widths which vary depending on the areas of the sub-pixels associated therewith.

12. A display apparatus according to claim 1 or 7, wherein low-resistivity conductors having mutually different resistances are disposed alternately in a horizontal scanning direction or in a vertical scanning direction.

13. A display apparatus according to claim 1 or 7, wherein low-resistivity conductors having mutually different resistances are disposed alternately in a horizontal scanning direction and in a vertical scanning direction.

14. A display apparatus according to claim 1 or 7, wherein first and second sub-pixels having mutually different areas are connected to a first low-resistivity conductor having a prescribed resistance, and third and fourth sub-pixels having mutually different sub-pixels are connected to a second low-resistivity conductor having a resistance higher than the prescribed resistance.

15. A display apparatus according to claim 14, wherein the first and second sub-pixels are disposed on a common scanning line, and the third and fourth sub-pixels are disposed on another common scanning line.

16. A display apparatus according to claim 1 or 7, wherein a sub-pixel connected to a first low-resistivity conductor having a prescribed resistance has an area which is 1.5 to 2.5 times that of a sub-pixel connected to a second low-resistivity conductor having a resistance higher than the prescribed resistance.

17. A display apparatus according to claim 16, wherein at least two sub-pixels having mutually different areas are connected to the first low-resistivity conductor.

18. A display apparatus according to claim 16, wherein at least two sub-pixels having mutually different areas are connected to the second low-resistivity conductor.

19. A display apparatus according to claim 16, wherein at least three sub-pixels having mutually different areas are disposed in succession and connected in parallel to the first or second low-resistivity conductor so that one having a smallest area among the three sub-pixels is disposed between the remaining two sub-pixels.

20. A display apparatus according to claim 1 or 7, wherein said sub-pixels are in a plurality of mutually different colors.

21. A display apparatus according to claim 1 or 7, wherein the display apparatus is a color display apparatus including a multiplicity of color pixels in plural colors, and each color pixel is divided into said at least two or three sub-pixels.

22. A display apparatus according to claim 21, wherein said color display apparatus includes a multiplicity of color pixels in three colors of first to three colors, the first and second low-resistivity conductors having mutually different resistances are arranged alternately in a horizontal scanning direction, and the sub-pixels in the first to third colors are arranged repetitively in the horizontal scanning direction.

23. A display apparatus according to claim 22, wherein said first to three colors are red, green and blue.

24. A display apparatus according to claim 1 or 7, further including a light source.

25. A display apparatus according to claim 1 or 7, further including a signal source for generating picture signals supplied to the display apparatus.

26. A display apparatus, comprising a group of scanning electrodes and a group of data electrodes intersecting the scanning electrodes so as to form a sub-pixel at each intersection of the scanning electrodes and the data electrodes so that a plurality of the sub-pixels constitute a pixel in combination and the display apparatus is provided with a multiplicity of such pixels, wherein at least one of the group of scanning electrodes and the group of data electrodes includes a first-type electrode comprising a combination of a first transparent conductor film having a first area and a first low-resistivity conductor connected to the first transparent conductor film, and a second-type electrode comprising a combination of a second transparent conductor film having a second area smaller than the first area and a second low-resistivity conductor connected to the second transparent conductor film, and the first low-resistivity conductor has a lower resistance than the second low-resistivity conductor to provide an identical driven waveform delay characteristic.

27. A display apparatus according to claim 26, wherein each of the first and second transparent conductor films is in a form of roughly a stripe but divided into a plurality of discrete segments.

28. A display apparatus according to claim 26, wherein at least one of the first and second transparent conductor films is in the form of a continuous stripe.

29. A display apparatus according to claim 26, wherein said first and second low-resistivity conductors are composed of an identical material having a lower resistivity than that of the transparent conductor films.

30. A display apparatus according to claim 29, wherein said first and second low-resistivity conductors have an identical thickness.

31. A display apparatus according to claim 26, wherein said first transparent conductor film is a transparent electrode providing at least two sub-pixels having mutually different areas, and said second transparent conductor film is a transparent electrode providing a sub-pixel having a different area from those of said at least two sub-pixels.

32. A display apparatus according to claim 26, wherein said first and second low-resistivity conductors are disposed alternately in a horizontal scanning direction or in a vertical scanning direction.

33. A display apparatus according to claim 26, wherein said first and second low-resistivity conductors are disposed alternately in a vertical scanning direction.

34. A display apparatus according to claim 26, wherein first and second sub-pixels having mutually different areas are connected to said first low-resistivity conductor third and fourth sub-pixels having mutually different sub-pixels are connected to said second low-resistivity conductor, the first and second sub-pixels are disposed on a common scanning line, and the third and fourth sub-pixels are disposed on another common scanning line.

35. A display apparatus according to claim 26, wherein a sub-pixel connected to said first low-resistivity conductor has an area which is larger than that of a sub-pixel connected to said second low-resistivity conductor disposed on an electrode common to said sub-pixel.

36. A display apparatus according to claim 26, wherein at least three sub-pixels having mutually different areas are disposed in succession on an electrode connected to the first or second low-resistivity conductor so that one having a smallest area among the three sub-pixels is disposed between the remaining two sub-pixels.

37. A display apparatus according to claim 26, wherein said sub-pixels are in a plurality of mutually different colors.

38. A display apparatus according to claim 26, wherein the display apparatus is a color display apparatus including a multiplicity of color pixels in plural colors, and each color pixel is divided into said at least two or three sub-pixels.

39. A display apparatus according to claim 38, wherein said color display apparatus includes a multiplicity of color pixels in three colors of first to three colors, the first and second low-resistivity conductors having mutually different resistances are arranged alternately in a horizontal scanning direction, and the sub-pixels in the first to third colors are arranged repetitively in the horizontal scanning direction.

40. A display apparatus according to claim 39, wherein said first to three colors are red, green and blue.

41. A display apparatus according to claim 26, further including a light source.

42. A display apparatus according to claim 26, further including a signal source for generating picture signals supplied to the display apparatus.

43. A display apparatus according to claim 26, wherein the display apparatus is a color display apparatus including a multiplicity of color pixels in three colors, each color pixel is divided into a plurality of sub-pixels, and sub-pixels of three colors are equally provided with the first and second low-resistivity conductors.

44. A display apparatus according to claim 26, wherein the resistances of the first and second low-resistivity conductors have a ratio therebetween which is inversely proportional to a ratio between the areas of the first and second transparent conductor films.

45. A display apparatus according to claim 26, wherein each pixel is designed to have a display state depending on an orientation state of a chiral nematic liquid crystal or a chiral smectic liquid crystal disposed thereat.

* * * * *

UNITED STATES PATENT AND TRADEMARK OFFICE
CERTIFICATE OF CORRECTION

PATENT NO. : 6,072,555
DATED : June 6, 2000
INVENTOR(S) : Atsushi Mizutome et al.

It is certified that error appears in the above-identified patent and that said Letters Patent is hereby corrected as shown below:

Sheet 1,
FIG. 1A, replace Figure 1A with attached Figure 1A;
Figure 1B, replace Figure 1B with attached Figure 1B;
Figure 1C, replace Figure 1C with attached Figure 1C.

Figure 2:
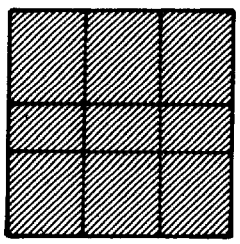
FIG. 2 shows 16 sub-pixel lighting patterns corresponding to 16 gradation levels.
Figure 2:
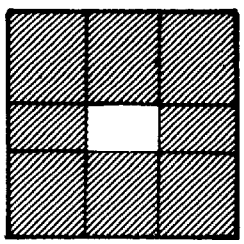
Figure 2:
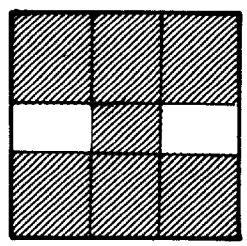
Figure 2:
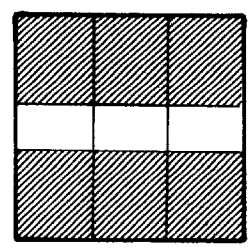
Figure 2:
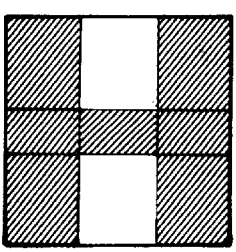
Figure 2:
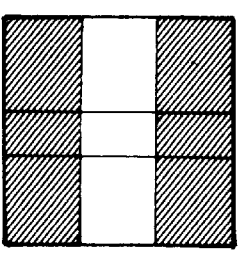
Figure 2:
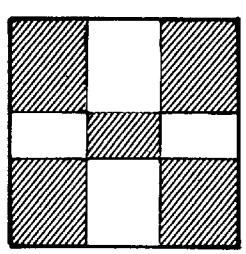
Figure 2:
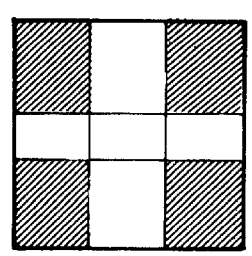
Figure 2:
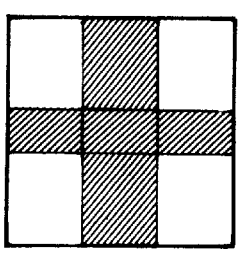
Figure 2:
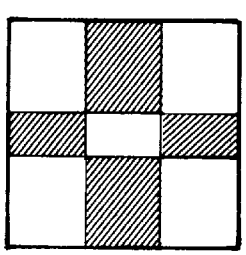
Figure 2:
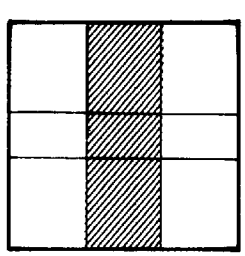
Figure 2:
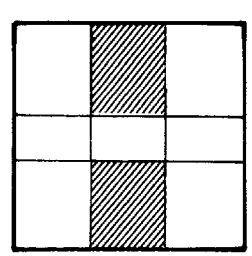
Figure 2:
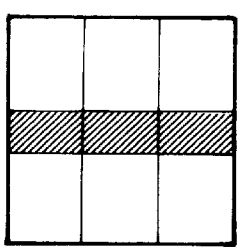
Figure 2:
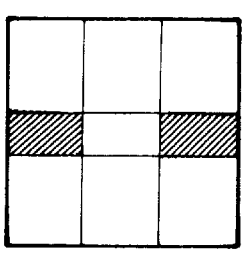
Figure 2:
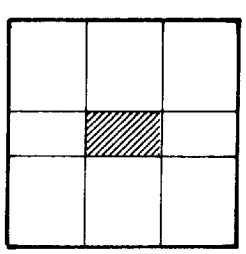
Figure 2:
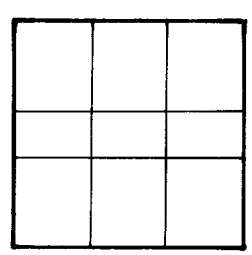

Sheet 2,
Figure 2, replace Figure 2 with attached Figure 2.

Sheet 3,
"DISPLY" should read -- DISPLAY --.

Sheet 7,
Figure 7B, replace Figure 7B with attached amended Figure 7B.

Sheet 9,
Figure 9, replace Figure 9 with attached amended Figure 9.

Column 1,
Line 51, "descried" should read -- described --.

Column 2,
Line 12, "substrate" should read -- substrates --;
Line 23, "FIG. 2.  White" should read -- Fig. 2, white --;
Line 38, "also practiced to" should read -- practical to also --;
Line 54, "characteristic" should read -- characteristics --.

Column 4,
Line 54, "characteristic" should read -- steps. --.

UNITED STATES PATENT AND TRADEMARK OFFICE
CERTIFICATE OF CORRECTION

PATENT NO. : 6,072,555
DATED : June 6, 2000
INVENTOR(S) : Atsushi Mizutome et al.

It is certified that error appears in the above-identified patent and that said Letters Patent is hereby corrected as shown below:

Column 5,
Line 8, "Mln)" should read -- MIn --;
Line 20, "(sub-) pixel," should read -- (sub-)pixel, --;
Line 32, "(sub-) pixels" should read -- (sub-)pixels --.

Column 6,
Line 5, "(sub-) pixels" should read -- (sub-)pixels --;
Line 50, "such two" should read -- two such --;
Line 62, "(sub-) pixels" should read -- (sub-)pixels --;

Column 7,
Line 6, "level." should read -- levels. --;
Line 8, "problem" should read -- problems --.

Column 8,
Line 49, "or C," should read -- or Cc, --.

Column 9,
Line 36, "G4'" should read -- B4' --;
Line 37, "totally" should read -- in total --.

Column 10,
Line 12, "$\mu$-wide" should read -- $\mu$m-wide --;
Line 58, "20 82 m." should read -- 20$\mu$m. --.

Column 11,
Line 30, "(sub-) pixels" should read -- (sub-)pixels --.
Line 63, "sub-pixel," should read -- sub-pixel --.

Column 12,
Line 61, "to three" should read -- to third --.

UNITED STATES PATENT AND TRADEMARK OFFICE
CERTIFICATE OF CORRECTION

PATENT NO.   : 6,072,555
DATED        : June 6, 2000
INVENTOR(S)  : Atsushi Mizutome et al.

It is certified that error appears in the above-identified patent and that said Letters Patent is hereby corrected as shown below:

Column 13,
Line 2, "three" should read -- third --;
Line 12, "constitute" should read -- constitutes --.

Column 14,
Line 27, "to three" should read -- to third --;
Line 34, "three" should read -- third --.

Signed and Sealed this

Twenty-fifth Day of December, 2001

Attest:

Attesting Officer

JAMES E. ROGAN
Director of the United States Patent and Trademark Office

United States Patent [19]
Mizutome et al.

[11] Patent Number: 6,072,555
[45] Date of Patent: Jun. 6, 2000

[54] DISPLAY APPARATUS CAPABLE OF GRADATIONAL DISPLAY

[75] Inventors: Atsushi Mizutome, Hayamamachi; Kazunori Katakura; Jun Iba, both of Atsugi, all of Japan

[73] Assignee: Canon Kabushiki Kaisha, Tokyo, Japan

[21] Appl. No.: 08/789,869

[22] Filed: Jan. 28, 1997

[30] Foreign Application Priority Data

Feb. 1, 1996  [JP]  Japan .................................. 8-016601

[51] Int. Cl.$^7$ .................... G02F 1/1335; G02F 1/1343
[52] U.S. Cl. ..................... 349/144; 349/108; 349/148
[58] Field of Search ..................... 349/37, 85, 108, 349/109, 143, 144, 148

[56] References Cited

U.S. PATENT DOCUMENTS

| | | | |
|---|---|---|---|
| 4,709,995 | 12/1987 | Kuribayashi et al. | 345/89 |
| 4,712,877 | 12/1987 | Okada et al. | 349/85 |
| 4,728,176 | 3/1988 | Tsuboyama et al. | 349/138 |
| 4,776,676 | 10/1988 | Inoue et al. | 349/85 |
| 4,791,417 | 12/1988 | Bobak | 349/89 |
| 4,796,980 | 1/1989 | Kaneko et al. | 349/85 |
| 4,818,078 | 4/1989 | Mouri et al. | 349/37 |
| 4,824,218 | 4/1989 | Kuno et al. | 349/37 |
| 4,902,103 | 2/1990 | Miyake et al. | 349/144 |
| 5,000,545 | 3/1991 | Yoshioka et al. | 349/148 |
| 5,124,695 | 6/1992 | Green | 345/103 |
| 5,212,575 | 5/1993 | Kojima et al. | 349/147 |
| 5,317,437 | 5/1994 | Katakura | 349/144 |
| 5,404,236 | 4/1995 | Hartman et al. | 349/143 |
| 5,438,442 | 8/1995 | Katakura | 349/144 |
| 5,552,911 | 9/1996 | Okada et al. | 349/106 |

FOREIGN PATENT DOCUMENTS

| | | |
|---|---|---|
| 0261898 | 3/1988 | European Pat. Off. . |
| 316 774 | 5/1989 | European Pat. Off. . |
| 0361981 | 4/1990 | European Pat. Off. . |
| 0453033 | 10/1991 | European Pat. Off. . |
| 0526135 | 2/1993 | European Pat. Off. . |
| 600 537 | 6/1994 | European Pat. Off. . |
| 0671648 | 9/1995 | European Pat. Off. . |
| 0671649 | 9/1995 | European Pat. Off. . |
| 0673012 | 9/1995 | European Pat. Off. . |

*Primary Examiner*—William L. Sikes
*Assistant Examiner*—Dung Nguyen
*Attorney, Agent, or Firm*—Fitzpatrick, Cella, Harper & Scinto

[57] ABSTRACT

A display apparatus is constituted to have a multiplicity of pixels each divided into at least two sub-pixels having mutually different areas including a larger sub-pixel having a larger area and a smaller sub-pixel having a smaller area. Each sub-pixel is provided with a transparent electrode and a low-resistivity conductor connected to the transparent electrode, and the low-resistivity conductor for the larger sub-pixel is set to have a lower resistance than the low-resistivity conductor for the smaller sub-pixel. As a result, a pixel switching characteristic can be uniformized over an entire picture area of the display apparatus regardless of different areas (loads) of the sub-pixels and without using different performances of drivers.

45 Claims, 9 Drawing Sheets

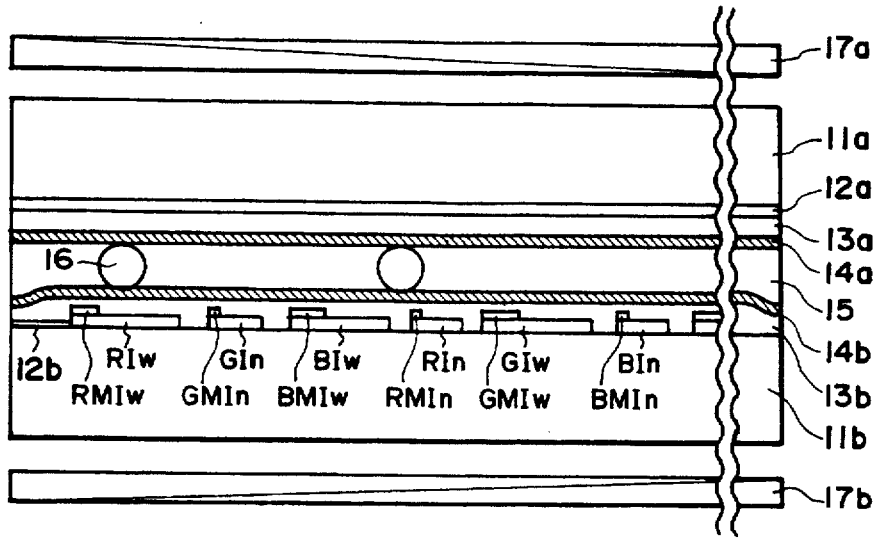

LEVEL 0     LEVEL 1     LEVEL 2     LEVEL 3

LEVEL 4     LEVEL 5     LEVEL 6     LEVEL 7

LEVEL 8     LEVEL 9     LEVEL 10     LEVEL 11

LEVEL 12     LEVEL 13     LEVEL 14     LEVEL 15